3,795,568
COMPRESSIBLE PRINTING BLANKET AND
METHOD OF MANUFACTURE
Thomas C. Rhodarmer, Canton, and Wayne W. Easely
and Billy Pryor, Waynesville, N.C., assignors to Dayco
Corporation, Dayton, Ohio
Filed Feb. 24, 1972, Ser. No. 228,989
Int. Cl. B32b 5/00
U.S. Cl. 161—87                    1 Claim

ABSTRACT OF THE DISCLOSURE

A printing blanket and method of manufacture, in which the blanket has a base fabric, an elastomeric surface layer, and a compressible intermediate layer. The intermediate layer is formed of an elastomeric matrix into which fine latex foam rubber particles have been incorporated to create microcellular voids, resulting in a closed cell structure in the layer.

BACKGROUND OF THE INVENTION

This invention relates to printing blankets and method of manufacturing such blankets. The type of blanket referred to herein is compressible and is used primarily in offset lithographic printing, but may also find utility in other fields of printing.

The use of blankets in offset lithography is well known and has a primary function of transferring the ink from the printing plate to the paper. Printing blankets are very carefully designed so that the surface of the blanket is not damaged either by the mechanical contact with the parts of the press or by chemical reaction with the ink ingredients. The repeated contacts cause a certain amount of compression of the blanket which must be within proper limits so that the image is properly reproduced without causing permanent deformation of the blanket. It is vital that the blanket be capable of eventually returning to its original thickness, and that it provide constant image transfer regardless of the amount of use to which it is put.

In addition to the inherent variations of the printing apparatus, conventional blankets may also have minute variations in thickness which are formed during the manufacturing steps. The existing high or low spots in such a blanket may, therefore, create uneven reproductions on the finished product.

Printing blankets are normally composed of a base material which will give the blanket integrity, and woven fabrics are preferred for this base. The base may consist of one, two, three, or more layers of fabric. The working surface, by which is meant the surface that actually contacts the ink, is usually an elastomeric layer made of natural or synthetic rubber which is applied over the base layer. This is usually done by calendering or spreading rubber in successively thin layers until a desired thickness of rubber has been deposited, after which the assembly is cured to provide the finished blanket. Such a blanket is perfectly acceptable for many kinds of printing, but often lacks the necessary compressibiliy for other operations. It is desirable, however, to have more highly compressible blankets available.

It is difficult to obtain this improved compressibility factor by the standard construction described above because the rubber material, while it is highly elastomeric, cannot be compressed in a direction at right angles to its surface without causing a distortion or stretch of the blanket. If irregularities exist in the printing plate, the presses, or the paper, then the compression to which the blanket is exposed will vary during the operation. Other approaches to compressible blanket design must be made.

Blanket manufacturers have introduced products in the past in an effort to create additional compressibility, such as by the use of plasticizers, textile fibers, special fabric layers, or felt. Some of these are described in U.S. Pats. No. 2,792,322, No. 3,147,698, and No. 3,285,799. None of these have produced ideal results because of various reasons, such as the following:

(1) The materials used do not have a uniform closed-cell structure and, therefore, do not provide uniform compressibility.

(2) Blankets having open-cell fibrous intermediate layers are subject to wicking of the inks and solvents which are used. These materials attack the blanket and shorten its life. Such layers also have poor strength properties.

(3) A layer is formed by a blowing process which occurs during vulcanization. This is not satisfactory because uniform cellular structures cannot be achieved by such a process.

(4) The use of fibers, felts, or fabrics does not permit uniformity and does not provide equal compressibility throughout the life of the blanket, due to the tendency of the material to permit wicking. Such materials are also too stiff because of the permeation of rubber into the other material.

SUMMARY OF THE INVENTION

The present invention provides an offset blanket having a compressibility which meets all the needs of the industry. This is accomplished by providing an intermediate layer between the base fabric and the working surface, this intermediate layer being fromed of an elastomeric matrix in which are dispersed finely ground particles of cured latex foam rubber having an average particle size of 153 microns in diameter, with a density less than 0.052 gram per cubic centimeter. These particles are incorporated directly into the matrix which is then spread onto the base fabric. Another fabric ply is placed over this intermediate layer, and then an outer layer or working surface is spread onto the fabric ply. The entire assembly is cured and the particles become completely and uniformly embedded in the matrix in such a way that unconnected voids slightly larger than the particles are formed uniformly throughout the matrix to form a closed cellular structure. The voids remain unconnected and do not agglomerate into larger voids. The resultant blanket is thus sufficiently compressible to avoid all the irregularities in operation described above, is consistent and substantially uniform throughout, and may be controlled to achieve any desired compressibility. The term "compressibility," as used in the printing art, refers to the ability of the blanket to compress and return readily, without distortion in lateral directions. The structural integrity and cohesive strength of such an intermediate layer is very high and the voids are never ruptured and thus remain intact throughout the layer regardless of the compression and expansion of the blanket. Because of the fact that these voids are fully enclosed, and the particles within the voids are compressible, the matrix is unusually resilient so that a rapid compression and expansion takes place even during the high speed operation of the presses in which they are used.

DESCRIPTION OF THE PREFERRED EMBODIMENT

Figure 1:
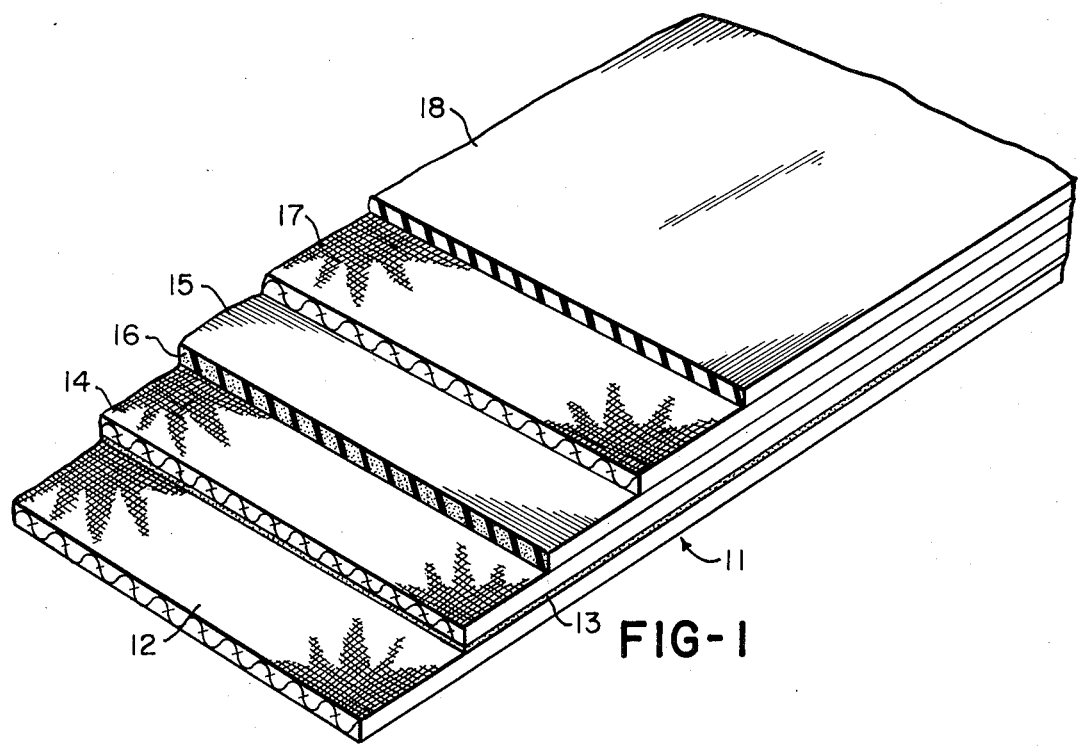
FIG. 1 is an isometric view of a segment of the novel blanket with parts broken away to illustrate the invention.

The printing blanket 11 which is illustrated in FIG. 1 consists of the base fabric which in this case is formed of two plies of woven fabric 12 and 14. It is, of course, conventional to utilize one, two, three, or even more layers as the base fabric, depending on the type of product which is desired. The specific type of fabric to be utilized will not be described in great detail since this is conventional in the manufacture of printing blankets, but the plies are usually low stretch fabrics such as certain types of cotton, rayon, or glass. In the normal manufacturing process, the plies are formed of a long band of fabric. The plies 12 and 14 are bonded together by an adhesive layer 13, which is a neoprene cement or other suitable material.

The compressible intermediate layer 15 is formed by conventional rubber processing methods and consists essentially of a synthetic elastomeric material such as butadiene-acrylontrile rubber and standard curatives and pigments. The compressibility is achieved by mixing into this material about 200 parts by weight of particles (designated by reference numeral 16) for each 100 parts of the elastomeric material; included in the mixture are also about 100 parts of aromatic solvent and small quantities of the aforementioned curatives and pigments. The materials are thoroughly mixed and spread onto the fabric layer and heated to evaporate most of the solvent. The thickness of this intermediate layer is approximately .010 inch to .015 inch. Another ply of fabric 17, similar to plies 12 and 14, is placed over the layer 15. The last step in the construction is to apply the surface layer 18 of rubber by conventional spreading processes until the desired surface layer thickness is achieved (approximately .010 inch thick). The conventional curing processes are then applied to laminate the various plies and layers into the final product. The blanket will have an over-all thickness of approximately .065 inch. If desired, additional layers of adhesive, similar to layer 13, may be placed between layer 15 and fabric plies 14 and 17.

The particles 16, which are the key to forming the compressible layer, are preferably formed of cured latex foam rubber particles. Sheets or blocks of conventional cured latex foam rubber, such as used for mattresses, cushions or pillows, may be utilized for this purpose, and it has been found that those having a density less than 0.052 gram per cubic centimeter are preferred as having a desirable compressibility. Segments of this material are ground in a hammer mill, comminuting machine, or similar apparatus until the particles achieve an average diameter of 153 microns, these particles also being compressible.

Figure 2:
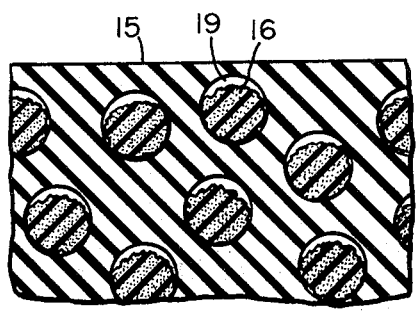
FIG. 2 is a greatly enlarged cross section of the compressible layer, illustrating further principles of the invention.

The particles are mixed into the matrix and the complete blanket is vulcanized or cured as described above. In the finished product, the particles are enclosed within the matrix in such a way that a void 19 is formed around each individual particle, thus creating a number of unconnected voids uniformly distributed within the matrix. The resultant intermediate layer 15 has a closed-cell cellular structure. Each void is slightly larger than the particle contained therein, and it is believed this occurs because the particle is in a cured state prior to incorporation within the matrix; during the vulcanization of the blanket, the particles are not compatible with the walls of the void. Thus the particles will not be bonded to the walls, which tend to shrink away from the particles. As shown in FIG. 2, therefore, the cellular structure is formed of the matrix having a series of voids, each containing a slightly smaller compressible particle 16 of latex foam rubber.

When the blanket is in use, the layer 15 may be compressed, with the voids permitting a first stage of compression and the compressible particles 16 permitting further compression. The completed blanket when subjected to 125 p.s.i. pressure at right angles to the face will permit a compression or deflection of approximately .004 inch to .011 inch, which has been determined to be ideal for conditions of use. The following examples are typical of the type of printing blankets which may be manufactured in accordance with this invention:

Example I

Two fabric plies of .015 inch each were formed of cotton duck fabric which had been prestretched to give dimensional stability. These plies were bonded together by neoprene cement and placed upon a conventional blanket manufacturing machine. The top face of the second ply was coated with an adhesive. 15 parts of finely ground cured latex foam rubber particles, having an average size of 153 microns were thoroughly mixed with 100 parts of toluene and 100 parts of a butadiene-acrylonitrile rubber compound into which had previously been compounded small quantities of zinc oxide, carbon black, and an accelerator. The mixture was spread onto the fabric and exposed to a temperature of 100° F. to remove most of the solvent, leaving a layer about .010 inch thick. A third fabric ply of adhesive coated cotton duck was placed over the spread layer, and the assembly was then passed through the spreading machine and a standard surface layer, consisting primarily of acrylonitrile-butadiene rubber was applied by repeated steps until a layer of .010 inch was built up. The entire assembly was cured at a temperature of 290° F. and had a thickness of .065 inch.

Example II

The blanket of this example was made by the same steps and from the same materials as in the preceding example. In this example, however, the proportion of ingredients was 25 parts of particles to 100 parts of aromatic solvent and 100 parts of butadiene-acryonitrile rubber.

Example III

The blanket of this example was made by the same steps and from the same materials as in Example I, except that the matrix layer was .015 inch thick instead of .010 inch thick.

It should be noted that for an elastomer having a given softness and resilience, the compressibility will be increased by increasing the total void volume per unit volume of matrix. This void volume may increase because of an increase in the number of particles, the size of the particles, or a combination of both. The compressibility will also increase as the thickness of the of the intermediate layer increases, with a constant softness and resilience of the elastomer and constant total void volume. Various elastomers may be used and may be compounded to provide different degrees of softness and resilience, as known in the art. And finally, reducing the density of the particles tends to increase the compressibility of the intermediate layer.

The high compressibility of the blanket is caused by the fact that the particles create a closed-cell cellular structure with unconnected voids; these voids and the particles contained therein being highly elastic and subject to repeated compression without affecting the structural integrity of the matrix layer.

We claim:
1. A laminated printing blanket comprising at least one fabric base ply, a surface layer, and a compressible intermediate layer, said blanket having a compression of .004 inch to .011 inch under a pressure of 125 p.s.i., said intermediate layer comprising an elastomeric matrix material having a closed-cell cellular structure formed of unconnected voids uniformly distributed throughout said matrix, said voids containing particles of compressible latex foam rubber having an average diameter of about 153 microns and being present in said matrix in the ratio of about 200 parts by weight per 100 parts of matrix material, said particles being free of bonding to the walls of said voids.

References Cited
UNITED STATES PATENTS

| 3,700,541 | 10/1972 | Shrimpton et al. | 161—DIG 005 |
|---|---|---|---|
| 1,778,185 | 10/1930 | De Vries | 161—401 |
| 2,099,024 | 11/1937 | Lewis | 161—401 |
| 2,792,322 | 5/1957 | Fredericks | 161—401 |
| 3,046,172 | 7/1962 | Reid | 161—160 |

GEORGE F. LESMES, Primary Examiner
J. J. BELL, Assistant Examiner

U.S. Cl. X.R.
101—453; 117—163; 161—DIGEST .005, 93, 401, 160